(12) United States Patent
Yoshimi

(10) Patent No.: US 7,894,439 B2
(45) Date of Patent: Feb. 22, 2011

(54) COMMUNICATION DEVICE IN A VIRTUAL PRIVATE NETWORK USING A MULTI PROTOCOL LABEL SWITCH

(75) Inventor: Makoto Yoshimi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 12/187,457

(22) Filed: Aug. 7, 2008

(65) Prior Publication Data
US 2009/0103538 A1    Apr. 23, 2009

(30) Foreign Application Priority Data
Oct. 22, 2007    (JP) .............................. 2007-273608

(51) Int. Cl.
*H04L 12/28* (2006.01)
*H04L 12/56* (2006.01)
(52) U.S. Cl. ............... 370/392; 370/395.3; 370/395.31; 370/401
(58) Field of Classification Search ........................ None
See application file for complete search history.

(56) References Cited

U.S. PATENT DOCUMENTS

| | | | |
|---|---|---|---|
| 6,697,361 B2 * | 2/2004 | Fredette et al. | 370/389 |
| 7,023,846 B1 * | 4/2006 | Andersson et al. | 370/389 |
| 7,035,226 B2 * | 4/2006 | Enoki et al. | 370/254 |
| 7,068,654 B1 * | 6/2006 | Joseph et al. | 370/392 |
| 7,564,803 B1 * | 7/2009 | Minei et al. | 370/254 |
| 7,568,047 B1 * | 7/2009 | Aysan et al. | 709/238 |
| 2001/0033574 A1 * | 10/2001 | Enoki et al. | 370/396 |
| 2002/0083174 A1 * | 6/2002 | Hayashi et al. | 709/225 |
| 2004/0136357 A1 | 7/2004 | Jo et al. | 370/351 |
| 2006/0133265 A1 * | 6/2006 | Lee | 370/228 |
| 2006/0262735 A1 * | 11/2006 | Guichard et al. | 370/254 |
| 2007/0127502 A1 * | 6/2007 | Zhu | 370/397 |
| 2007/0217420 A1 * | 9/2007 | Raj et al. | 370/392 |
| 2007/0217428 A1 * | 9/2007 | Wijnands et al. | 370/395.5 |
| 2009/0028148 A1 * | 1/2009 | Cao et al. | 370/390 |

FOREIGN PATENT DOCUMENTS

JP    2004-147021    5/2004

* cited by examiner

*Primary Examiner*—Salman Ahmed
*Assistant Examiner*—Peter Chau
(74) *Attorney, Agent, or Firm*—Fujitsu Patent Center

(57) ABSTRACT

A communication device is, in an MPLS network including a first area and a second area, the first area being notified of aggregate route information into which pieces of route information on a plurality of routes are aggregated, and using an LDP for generating an LSP, located in the first area but spans between the first area and the second area and receives a message for generating the LSP using one of the plurality of routes within the second area, wherein the communication device is stored with aggregate route information, pieces of route information and labels, then determines whether the route information in the message is stored or not when receiving the message, and, if not stored, executes a label distribution process if the route specified by the route information is one of the routes aggregated with the stored aggregate route information.

4 Claims, 35 Drawing Sheets

Fig. 2

| NODE | Loopback ADDRESS |
|---|---|
| E 0 | 1.1.1.0/32 |
| E 1 | 1.1.1.1/32 |
| E 2 | 1.1.1.2/32 |
| E 3 | 1.1.1.3/32 |
| E 4 | 10.0.0.0/32 |

Fig. 4

| AREA | AGGREGATE ADDRESS |
|------|-------------------|
| 1    | 1.1.1.0/30        |
| :    | :                 |

Fig. 5

| FEC | NEXT HOP |
|---|---|
| 1.1.1.0/32 | 1.0.0.2 |
| 1.1.1.1/32 | 1.0.0.2 |
| 1.1.1.2/32 | 1.0.0.6 |
| 1.1.1.3/32 | 1.0.0.6 |
| 1.1.1.0/30 | − |
| : | : |

Fig. 6

| FEC | INPUT LABEL | OUTPUT LABEL | OUTPUT INTERFACE |
|---|---|---|---|
| 1.1.1.0/32 | 20 | 30 | IF0 |
| 1.1.1.1/32 | 21 | 31 | IF0 |
| 1.1.1.2/32 | 22 | 32 | IF1 |
| 1.1.1.3/32 | 23 | 33 | IF1 |
| 1.1.1.0/30 | 101 | POP | – |
| ⋮ | ⋮ | ⋮ | ⋮ |
| ⋮ | ⋮ | ⋮ | ⋮ |

Fig. 7

| FEC | INPUT LABEL | OUTPUT LABEL | OUTPUT INTERFACE |
|---|---|---|---|
| 1.1.1.0/30 | 100 | 101 | IF2 |
| : | : | : | : |
| : | : | : | : |

Fig. 8

| FEC | NEXT HOP |
|---|---|
| 1.1.1.0/30 | 10.1.1.1 |
| : | : |

Fig. 9

| FEC | INPUT LABEL | OUTPUT LABEL | OUTPUT INTERFACE |
|---|---|---|---|
| 1.1.1.0/30 | − | 100 | IF0 |
| : | : | : | : |
| : | : | : | : |

Fig. 13

| FEC | NEXT HOP |
|---|---|
| 1.1.1.0/30 | 10.1.1.5 |
| 1.1.1.2/32 | 10.1.1.5 |
| : | : |

Fig. 14

| FEC | INPUT LABEL | OUTPUT LABEL | OUTPUT INTERFACE |
|---|---|---|---|
| 1.1.1.0/30 | 100 | 101 | IF2 |
| 1.1.1.2/32 | 204 | 22 | IF2 |
| : | : | : | : |

Fig. 15

| FEC | INPUT LABEL | OUTPUT LABEL | OUTPUT INTERFACE |
|---|---|---|---|
| 1.1.1.0/30 | 300 | 100 | IF0 |
| 1.1.1.2/32 | 301 | 204 | IF0 |
| : | : | : | : |

Fig. 19

| FEC | NEXT HOP |
|---|---|
| ~~1.1.1.0/30~~ | ~~10.1.1.5~~ |
| ~~1.1.1.2/32~~ | ~~10.1.1.5~~ |
| : | : |

Fig. 20

| FEC | INPUT LABEL | OUTPUT LABEL | OUTPUT INTERFACE |
|---|---|---|---|
| ~~1.1.1.0/30~~ | ~~100~~ | ~~101~~ | ~~IF2~~ |
| ~~1.1.1.2/32~~ | 204 | 22 | ~~IF2~~ |
| : | : | : | : |

Fig. 21

| FEC | INPUT LABEL | OUTPUT LABEL | OUTPUT INTERFACE |
|---|---|---|---|
| ~~1.1.1.0/30~~ | ~~300~~ | ~~100~~ | ~~IF0~~ |
| ~~1.1.1.2/32~~ | ~~301~~ | 204 | ~~IF0~~ |
| : | : | : | : |

Fig. 24

| FEC | NEXT HOP |
|---|---|
| 1.1.1.0/30 | 10.1.1.5 |
| ~~1.1.1.2/32~~ | ~~10.1.1.5~~ |
| : | : |

Fig. 25

| FEC | INPUT LABEL | OUTPUT LABEL | OUTPUT INTERFACE |
|---|---|---|---|
| 1.1.1.0/30 | 100 | 101 | IF2 |
| ~~1.1.1.2/32~~ | ~~204~~ | ~~22~~ | ~~IF2~~ |
| : | : | : | : |

Fig. 26

| FEC | INPUT LABEL | OUTPUT LABEL | OUTPUT INTERFACE |
|---|---|---|---|
| 1.1.1.0/30 | 300 | 100 | IF0 |
| ~~1.1.1.2/32~~ | ~~301~~ | ~~204~~ | ~~IF0~~ |
| : | : | : | : |

Fig. 29

| FEC | NEXT HOP |
|---|---|
| ~~1.1.1.0/30~~ | ~~10.1.1.5~~ |
| ~~1.1.1.2/32~~ | ~~10.1.1.5~~ |
| : | : |

Fig. 30

| FEC | INPUT LABEL | OUTPUT LABEL | OUTPUT INTERFACE |
|---|---|---|---|
| ~~1.1.1.0/30~~ | ~~100~~ | ~~101~~ | ~~IF2~~ |
| ~~1.1.1.2/32~~ | 204 | 22 | ~~IF2~~ |
| : | : | : | : |

Fig. 31

| FEC | INPUT LABEL | OUTPUT LABEL | OUTPUT INTERFACE |
|---|---|---|---|
| ~~1.1.1.0/30~~ | ~~300~~ | ~~100~~ | ~~IF0~~ |
| ~~1.1.1.2/32~~ | ~~301~~ | ~~204~~ | ~~IF0~~ |
| : | : | : | : |

COMMUNICATION DEVICE IN A VIRTUAL PRIVATE NETWORK USING A MULTI PROTOCOL LABEL SWITCH

This application claims the benefit of Japanese Patent Application No. 2007-273608 filed on Oct. 22, 2007 in the Japan Patent Office, the disclosure of which is herein incorporated in its entirety by reference.

BACKGROUND OF THE INVENTION

1. Field of the Invention

The present invention relates to a communication device in a VPN (Virtual Private Network) using an MPLS (Multi Protocol Label Switch).

2. Description of the Related Art

Generally, a scheme for an enterprise to configure a private network involves a method of configuring the network by using a private line, a method of configuring the network through a wide area LAN (Local Area Network) service using Ethernet VLAN (Ethernet Virtual Local Area Network), and a method of configuring the network based on a VPN (Virtual Private Network) using an MPLS (Multi Protocol Label Switch). In these methods, the method employing the MPLS is lower in cost and easier in operation management than the wide area LAN service, and therefore the VPN service using the MPLS is spreading.

The VPN service using the MPLS is exemplified by an IP-VPN (Internet Protocol Virtual Private Network) defined as the VPN service of a Layer 3, PW (Pseudo Wire) defined as the VPN service of a Layer 2 and as a Point-to-Point service, and a VPLS (Virtual Private LAN Service) defined as a Multipoint-to-Multipoint service. Any services involve using two labels such as an MPLS label (user identification label) for identifying user traffic and an MPLS label (tunnel label) for identifying a direction of the traffic.

The MPLS employs an LDP (Label Distribution Protocol) defined in RFC3036 as a protocol for dynamically distributing the labels in order to set up the MPLS tunnel. According to the LDP, the labels are distributed based on route information generated by a routing protocol such as OSPF (Open Shortest Path First). The route information contains a network address consisting of a set of a prefix and a prefix length of an IP (Internet Protocol) address, information on a next hop (next node), etc. The LDP gives a terminology of this network address referred to as an FEC (Forwarding Equivalent Class).

The LDP generates the MPLS tunnel according to the route information (the network address, the next hop information, etc) generated by the routing protocol such as the OSPF.

The OSPF involves frequently using route aggregation when operated in a multi-area environment. The route aggregation is a technique of aggregating plural pieces of consecutive route information in a certain area into one single route information and advertising this aggregate route information to another area. This technique has a merit that a routing table and topology information retained by each router can be reduced. The route aggregation is conducted normally by an ABR (Area Border Router) according to the OSPF.

Considered herein is a case of operating the LDP in an OSPF multi-area environment.

If the route aggregation is not conducted based on the OSPF, the network address in a certain area is advertised to other areas, respectively. Hence, the LDP enables the individual network address to be recognized as the FEC. With this scheme, the MPLS spanning between the areas per FEC can be generated.

FIG. 33 is a diagram showing an operation of the LDP if the route aggregation is not conducted based on the multi-area OSPF.

In FIG. 33, four nodes in an area 1 advertise loopback addresses of [1.1.1.0/32], [1.1.1.1/32], [1.1.1.2/32], [1.1.1.3/32], respectively. Further, the ABR connecting the area 0 and the area 1 to each other, in an OSPF process, advertises these four loopback addresses to the area 0 without performing the route aggregation. The OSPF on each of the nodes in the area 0 and the area 2 recognizes the four network addresses. The OSPF inserts the four network addresses as the FECs into the LDP, whereby the LDP can allocate labels to the respective FECs and can thus advertise the label-allocated FECs. As a result, the MPLS tunnels of the four FECs can be generated extending across the area 0, the area 1 and the area 2.

In FIG. 34, the four nodes in the area 1 advertise the loopback addresses of [1.1.1.0/32], [1.1.1.1/32], [1.1.1.2/32], [1.1.1.3/32], respectively. Further, the ABR connecting the area 0 and the area 1 to each other, in the OSPF process, route-aggregates these four loopback addresses into a network address of [1.1.1.0/30] and thus advertises this aggregate route address to the area 0. The OSPF on each of the nodes in the area 0 and the area 2 recognizes only this route-aggregated network address. This route-aggregated network address gets inserted as the FEC into the OSPF. The LDP can allocate the label to only the FEC defined as the route-aggregated network address and can advertise this FEC. As a result, the MPLS tunnels for the route-aggregated address are generated in the area 0 and the area 2. The MPLS tunnels for the route-aggregated address are terminated at the ABR that performs the route aggregation. The MPLS tunnels for the route-aggregated address are recognized as different tunnels from the individual MPLS tunnels within the area 1.

[Patent document 1] Japanese Patent Laid-Open Publication No. 2004-147021

SUMMARY OF THE INVENTION

As described above, if the ABR performs the route aggregation, with respect to the MPLS nodes residing in the area including individual routes, the MPLS tunnels can not be generated from the MPLS nodes in the different area to which the aggregate route information is advertised.

In the case of providing the MPLS VPN service, the node residing halfway must not terminate the MPLS tunnel between edge nodes. Supposing that if the MPLS tunnel is terminated by the node residing halfway, the terminator node, though referring to an internal label that is the label allocated between the edge nodes but is not the label allocated by the node residing halfway, misrecognizes the label, resulting in a problem that an incorrect process is to be executed.

FIG. 35 is a diagram showing a case of conducting the route aggregation based on the multi-area OSPF and providing the MPLS VPN.

In FIG. 35, the ABR route-aggregates a loopback address of an edge node 2 in the network in the area 1 with a loopback address of another node and advertises the route-aggregated address to the area 0. The MPLS tunnel is not generated directly between the edge node 1 and the edge node 2, but there is generated the MPLS for the route-aggregated FEC, which is temporarily terminated by the ABR. Another assumption is that a label 10 for a user A is exchanged between the edge node 1 and the edge node 2. At this time, the edge node 1, when receiving a user packet from the user A, attaches the user recognition (identification) label 10 to the user packet, and transmits a packet (MPLS packet) encapsulated with a tunnel label 200 for the route-aggregated FEC. The ABR, when receiving this MPLS packet, refers to the external tunnel label 200. The ABR recognizes from this tunnel label 200 that the MPLS tunnel is terminated by the self-device (ABR). The ABR tries to determine a forwarding destination by removing the tunnel label and referring to the internal label. The label is, however, the label for identifying the user A, which is allocated between the edge node 1 and the edge node 2, and is not therefore the label allocated by the ABR. Accordingly, the ABR, if referring to the label 10, gets into mis-recognition. Presuming that if the ABR allocates the label 10 to a different user, such a problem arises that the packet is transmitted to a wrong address.

In the case of providing the VPN service in a large-scale network such as a nation-wide network, the number of the MPLS nodes and the number of the edge nodes rise up to several thousands. According to the OSPF performing the route control, it is desired that the route information retained by each node, the recovery time if a fault occurs and a fault affecting range are reduced to the greatest possible degree by segmenting the area. As a matter of fact, according to the OSPF, it is said that the node count in the area should be restrained down to approximately "100". Moreover, it is similarly desired that the loopback addresses, used for the VPN, of the edge nodes be route-aggregated. In that case, however, the MPLS VPN using the LDP can not be provided due to the problems given above.

It is an object of the present invention to provide an MPLS network service capable of generating the LSP spanning between the areas in the network including the route-aggregated area.

The present invention adopts the following means in order to solve the problems given above.

Namely, a first mode of the present invention is a communication device, in an MPLS (Multi Protocol Label Switch) network including at least a first area and a second area each as a unit for setting aggregation of pieces of route information, the first area being notified of aggregate route information into which the pieces of route information of a plurality of routes within the second area are aggregated, and using an LDP (Label Distribution Protocol) for generating an LSP (Label Switched Path) by distributing labels corresponding to the pieces of route information, being located within the first area but spanning between the first area and the second area and receiving a label mapping message for generating the LSP using one of the plurality of routes within the second area, the communication device comprising:

an aggregate route information storage unit stored with the aggregate route information into which the plural pieces of route information are aggregated;

a route information storage unit stored with the route information embraced by the aggregate route information;

a label storage unit stored with the labels corresponding to the pieces of route information stored in the route information storage unit;

a determining unit determining, when receiving the label mapping message, whether the route information contained in the label mapping message is stored in the route information storage unit or not; and a label control unit receiving, if the route information is not stored in the route information storage unit and if the route specified by the route information is one of the routes aggregated with the aggregate route information stored in the aggregate route information storage unit, the label mapping message and executing a label distribution process, wherein the label distribution process includes storing the route information in the route information storage unit, allocating the label to the route information, storing the label in the label storage unit, and forwarding the label mapping message containing the route information to a neighboring communication device.

According to the first mode of the present invention, in the area where the plurality of routes is aggregated, the label mapping message of each of the routes embraced by the aggregate route is transmitted to the communication device in the area, thereby generating the LSP of the route.

A second mode of the present invention is a communication device, in an MPLS network including at least a first area and a second area each as a unit for setting aggregation of pieces of route information, the first area being notified of aggregate route information into which the pieces of route information of a plurality of routes within the second area are aggregated, and using an LDP for generating an LSP by distributing labels corresponding to the pieces of route information, being located at a border between the first area and the second area as well as spanning between the first area and the second area and receiving a label mapping message transmission request for generating the LSP using one of the plurality of routes within the second area, the communication device comprising:

a route aggregation setting storage unit stored with the aggregate route information, advertised by the self-device to the first area, into which the plural pieces of route information are aggregated;

a route information storage unit stored with route information embraced by the aggregate route information; and a label control unit accepting, when receiving the label mapping message transmission request and if the route specified by the route information in the label mapping message is one of the routes aggregated with the aggregate route information stored in the route aggregation setting storage unit, the label mapping message transmission request and forwarding the label mapping message containing the route information to a neighboring communication device.

According to the second mode of the present invention, the label mapping message of each of the routes embraced by the aggregate route is transmitted to the area notified of the aggregate route information of the aggregate route into which the plurality of routes is aggregated, whereby the route LSP spanning between the areas can be generated.

According to the present invention, in the network including the route-aggregated area, it is feasible to provide the MPLS network service capable of generating the LSP spanning between the areas.

BRIEF DESCRIPTION OF THE DRAWINGS

FIG. 2 is a diagram showing a loopback address of an edge node in the network in FIG. 1.

FIG. 4 is a diagram showing a route aggregation setting table retained by an ABR.

FIG. 5 is a diagram showing an FEC DB in the ABR.

FIG. 6 is a diagram showing a label table in the ABR.

FIG. 7 is a diagram showing a label table in a core node C1.

FIG. 8 is a diagram showing the FEC DB in an edge node E4.

FIG. 9 is a diagram showing the label table in the edge node E4.

FIG. 13 is a diagram showing an FEC DB in the core node C1.

FIG. 14 is a diagram showing the label table in the core node C1.

FIG. 15 is a diagram showing the label table in the edge node E4.

FIG. 19 is a diagram showing the FEC DB in the core node C1.

FIG. 20 is a diagram showing the label table in the core node C1.

FIG. 21 is a diagram showing the label table in the edge node E4.

FIG. 24 is a diagram showing the FEC DB in the core node C1.

FIG. 25 is a diagram showing the label table in the core node C1.

FIG. 26 is a diagram showing the label table in the edge node E4.

FIG. 29 is a diagram showing the FEC DB in the core node C1.

FIG. 30 is a diagram showing the label table in the core node C1.

FIG. 31 is a diagram showing the label table in the edge node E4.

DETAILED DESCRIPTION OF THE INVENTION

An embodiment of the present invention will hereinafter be described with reference to the drawings. A configuration in the embodiment is an exemplification, and the present invention is not limited to the configuration in the embodiment.

Embodiment (Network Architecture)

Figure 1:
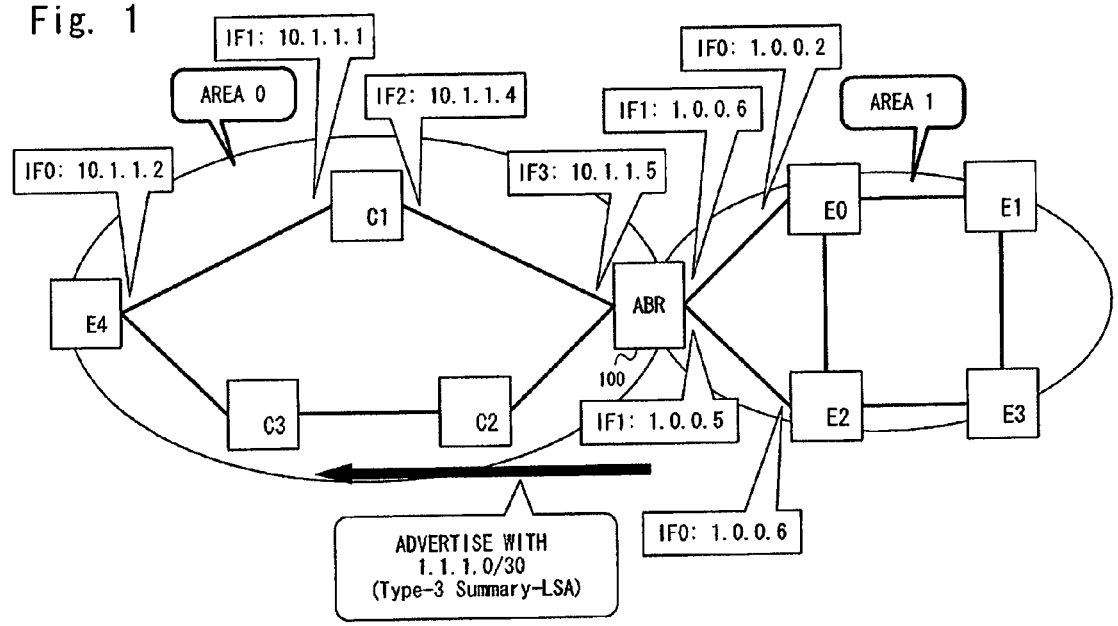
FIG. 1 is a view showing an example of a network architecture.

FIG. 1 is a view showing an example of a network architecture. An area of OSPF (Open Shortest Path First) is segmented into an area 0 and an area 1 by an ABR (Area Border Router) 100. Core nodes (C1, C2, C3) and an edge node (E4) reside in the area 0. Edge nodes (E0, E1, E2, E3) reside in the area 1.

FIG. 2 is a diagram showing a loopback address of the edge node in the network in FIG. 1. A loopback address (Loopback Address) is defined as an IP address held by a loopback interface of an MPLS LDP router.

The loopback address is allocated to each edge node in the network in FIG. 1. The loopback address is the IP address held by the loopback interface of the MPLS LDP router. An address [1.1.1.0/32] is allocated to the edge node E0, [1.1.1.1/32] is allocated to the edge node E1, [1.1.1.2/32] is allocated to the edge node E2, [1.1.1.3/32] is allocated to the edge node E3, and [10.0.0.0/32] is allocated to the edge node E4, respectively. The ABR 100 route-aggregates the loopback addresses [1.1.1.10/32] through [1.1.1.3/32] of the edge nodes E0, E1, E2 and E3 within the area 1, and advertises the aggregate route with the address [1.1.1.0/30] to the area 0. The aggregate route has route information that is advertised by the ASR, includes plural pieces of route information and contains a shorter length of network mask.

(Configuration of Node)

Figure 3:
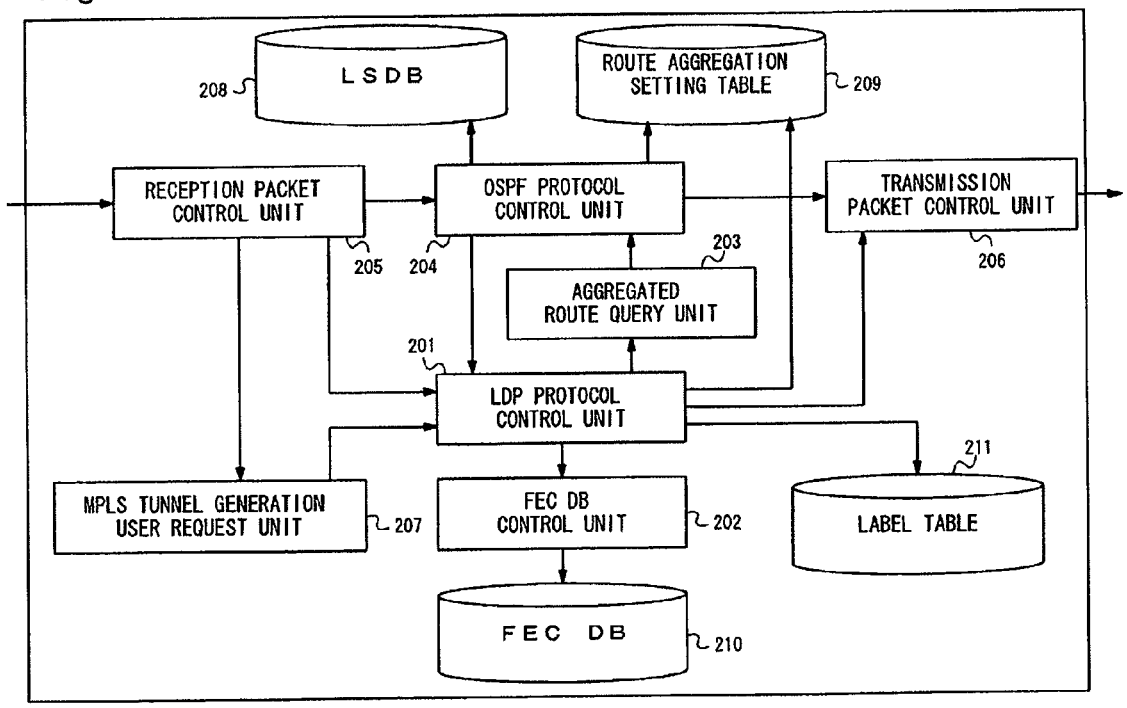
FIG. 3 is a diagram showing an example of configuration of the node.

FIG. 3 is a diagram showing an example of a configuration of the node. The node embraces the ABR, the core node and the edge node. The ABR is a boundary router at an OSPF area within a carrier network. The core node is an MPLS LDP router that is not connected to a user network within the carrier network. The edge node is the MPLS LDP router that is connected to the user network within the carrier network.

The node includes an LDP protocol control unit 201, an FEC DB control unit 202, an aggregate route query unit 203, an OSPF protocol control unit 204, a reception packet control unit 205, a transmission packet control unit 206, an MPLS tunnel generation user request unit 207, an LS DB 208, a route aggregation setting table 209, an FEC DB 210 and a label table 211. One or a plurality of components among the LS DB 208, the route aggregation setting table 209, the FEC DB 210 and the label table 211 may be stored in one single storage unit.

The LDP protocol control unit 201 transmits and receives the MPLS packet and controls an LDP protocol. Herein, a label distribution method can involve using a Downstream Unsolicited (DU) method. The aggregate route query unit 203 is used for querying about which Summary LSA route in the LS DB 208 managed by the OSPF protocol control unit 204 embraces an FEC route registered in the received label mapping message and the label withdraw message. If the aggregate route embraces the FEC route, this FEC is accepted as the normal FEC. The LDP protocol control unit 201 can function as a label control unit.

The FEC DB control unit 202 searches the FEC DB 210 for the FEC, and adds or deletes FEC information in response to a request of the LDP protocol control unit 201. The search through the FEC DB 210 involves searching for not only the FEC allocated by the LDP protocol control unit 201 but also the FEC of the route embraced by the allocated-FEC route. The FEC DB control unit 202 determines whether or not the FEC DB 210 is stored with the FEC allocated by the LDP protocol control unit 201 and the FEC of the route embraced by the allocated-FEC route. The FEC DB control unit 202 can function as a determining unit.

The aggregate route query unit 203 queries about which Summary LSA route in the LS DB 208 managed by the OSPF protocol control unit 204 embraces the given route in response to the request of the LDP protocol control unit 201.

The OSPF protocol control unit 204 controls the OSPF protocol. The OSPF protocol control unit 204 checks whether or not the LS DB 208 retains an LS type 3 Summary-LSA having the route that embraces the route given from the aggregate route query unit 203.

The reception packet control unit 205 distributes the received packets based on the protocol, and notifies the LDP protocol control unit 201 and the OSPF protocol control unit 204 of the distributed packets.

The transmission packet control unit 206 transmits the packets of which the LDP protocol control unit 201 and the OSPF protocol control unit 204 have notified.

The MPLS tunnel generation user request unit 207 receives an FEC input from the user, and notifies the LDP protocol control unit 201 of an FEC label mapping message transmission request or an FEC label withdraw message transmission request.

The LSDB (Link-State Database) 208 is a database stored with LSAs (Link-State Advertisements) within the network, which are collected by the OSPF protocol control unit 204. The LS DB 208 can be stored with aggregate route information of the aggregated routes. The LS DB 208 can function as an aggregate route information storage unit.

The route aggregation setting table 209 is a database stored with route aggregation setting information organized by an aggregate route information and a target area information, which are set in the OSPF protocol control unit 204.

The FEC DB 210 is a database stored with, as FEC information, the route information of which the FEC DB control unit 202 notifies.

The label table 211 is a database that retains items of information such as the FEC (consisting of a prefix and a prefix length) generated by the LDP protocol control unit 201, an input label (which is a label distributed by a self-node to other nodes), and an output label (which is a label attached to the route information received from a next hop (next node)) and an output interface (which is an interface to which the next hop is connected). The label table 211 is consulted when receiving the MPLS packet and is used for determining a packet forwarding destination.

The OSPF protocol control unit 204 of the ABR 100, upon receiving a route aggregation command, retains setting information for aggregating a plurality of routes into one single route in the route aggregation setting table 209. The ABR 100 advertises, based on the route aggregation setting, the aggregated route by an [LS Type-3 Summary-LSA] packet.

The node receiving the [LS Type-3 Summary-LSA] packet stores this packet in the LSDB 208. The OSPF protocol control unit 204 of the node recognizes the FEC contained in the packet as the FEC of which the LDP protocol control unit 201 is notified, and employs the FEC DB control unit 202 for storing this FEC in the FEC DB 210.

(Label Mapping of FEC of Aggregate Route)

Figure 4:
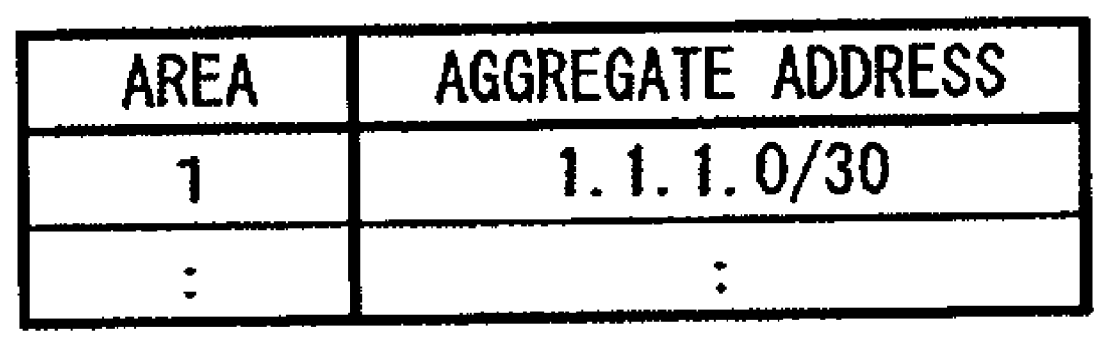

FIG. 4 is a diagram showing the route aggregation setting table retained by the ABR. The ABR 100 retains the route aggregation setting table 209.

The LDP, when operating in the network illustrated in FIG. 1, recognizes and handles the loopback addresses [1.1.1.0/32] through [1.1.1.3/32] within the area 1. Further, a label is distributed (attached) to the FEC. Moreover, the MPLS tunnel is generated per loopback address. On the other hand, within the area 0, the aggregate address [1.1.1.0/30] is recognized and treated as the FEC. Within the area 0, the label is distributed to the FEC by use of the label mapping message, then the LSP is generated, and the MPLS tunnel is generated for the aggregate route.

FIG. 5 is a diagram showing the FEC DB (database) 210 in the ABR 100. The ABR 100 retains four FEC entries of the loopback addresses [1.1.1.0/32] through [1.1.1.3/32] of the edge nodes within the area 1 and one FEC entry of the aggregate route address [1.1.1.0/30], as an aggregate of these four addresses, which is advertised to the area 0.

FIG. 6 is a diagram showing the label table 211 of the ABR 100. The ABR 100 retains the same FEC entries as those in the FEC DB 210 also in the label table 211.

Herein, the ABR 100 does not transmit the label mapping message of the FECs such as the loopback addresses [1.1.1.0/32] through [1.1.1.3/32] of the edge nodes in the area 1 to the area 0 to which the aggregate route is advertised. The ABR 100 transmits only the label mapping message of the FEC [1.1.1.0/30] defined as the aggregate route address of those FECS.

The LDP protocol control unit 201 of the core node C1, when receiving the label mapping message, uses the FEC DB control unit 202 for searching through the FEC DB 210. The LDP protocol control unit 201, when detecting the FEC entry contained in the label mapping message as a result of the search, accepts the label mapping message, then allocates the label to the FEC, and adds the entry of the label-allocated FEC to the label table 211. Moreover, the LDP protocol control unit 201 instructs the transmission packet control unit 206 to transmit the label mapping message of the FEC to other nodes.

FIG. 7 is a diagram showing the label table of the core node C1. The core node C1 retains, in the label table 211, a label [101] as an "output label" assigned to the FEC [1.1.1.0/30] distributed from the ABR 100, a label [100] as an "input label" allocated to the label [100], and [IF2] as an "output interface" to the ABR 100 serving as the next hop.

Figure 8:
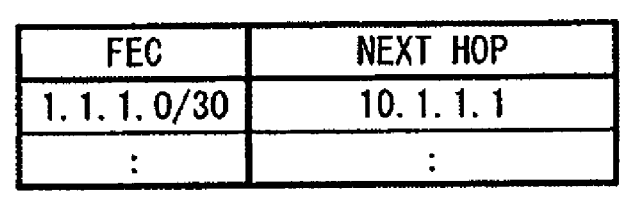

FIG. 8 is a diagram showing the FEC DB 210 in the edge node E4. The edge node E4 retains, in the FEC DB 210, the FEC [1.1.1.0/30] and [10.1.1.1] defined as an interface address of the core node C1, which is acquired from a calculation for the shortest route of the OSPF as the next hop.

FIG. 9 is a diagram showing the label table of the edge node E4. The edge node E4 retains, in the label table 211, a label [100] assigned to the FEC [1.1.1.0/30] distributed from the core node C1 as the next hop, and [IF0] as an "output interface" to the core node C1.

(Label Mapping of FEC of Route Embraced by Aggregate Route)

<Operation of ABR>

Figure 10:
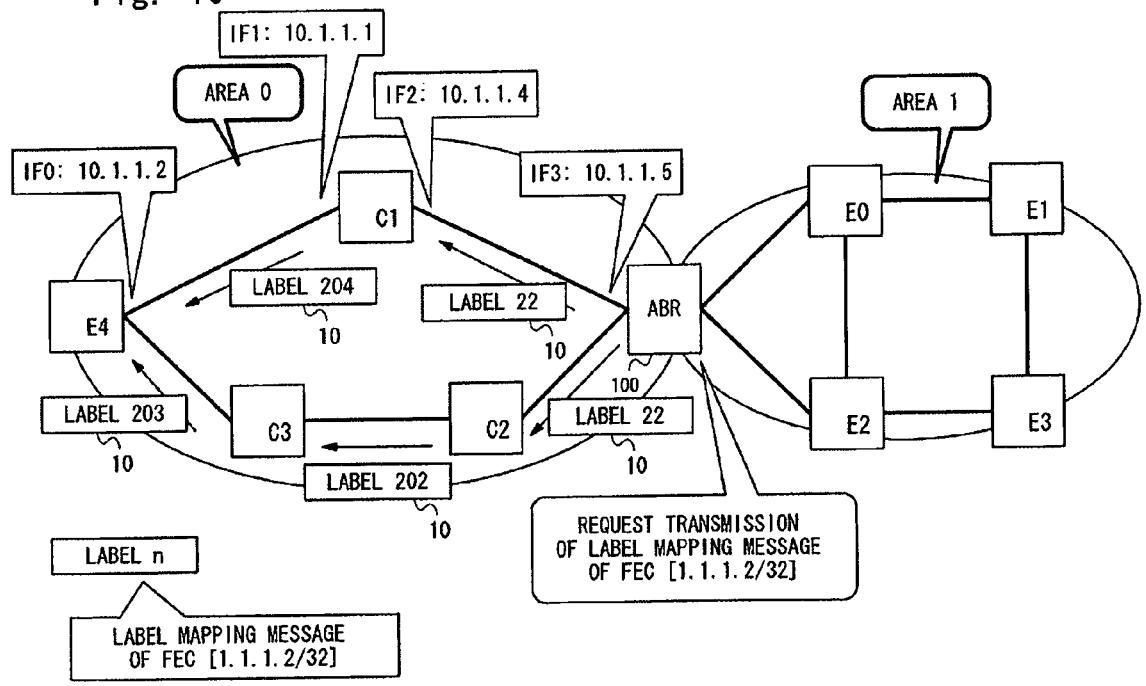
FIG. 10 is a diagram showing a label mapping message transmission request of FEC [1.1.1.2/32].

FIG. 10 is an explanatory diagram showing an operation when requesting the ABR 100 to transmit the label mapping message of the FEC as an address of a part of the aggregate route.

When the ABR 100 is requested to transmit the label mapping message of FEC [1.1.1.2/32] (edge node E2), the LDP protocol control unit 201 searches through the route aggregation setting table 209. The ABR 100 confirms that the self-device advertises the route specified by the requested FEC [1.1.1.2/32] to the area 0 with the route address [1.1.1.0/30] into which the route addresses are aggregated. Then, the ABR 100 accepts the label mapping message transmission request, and transmits the label mapping message containing the FEC [1.1.1.2/32] and a label [22] already allocated to the FEC to the neighboring core nodes C1, C2 in the area 0 to which the aggregate route is advertised.

In the ABR 100, as triggered by user's the label mapping message transmission request about the routes embraced by the aggregate route, the label mapping message of the FECs of the routes embraced by the aggregate route can be sent to the nodes in the area to which the ABR 100 advertises the aggregate route. Owing to the label mapping message, the MPLS tunnel with the FECs of the routes embraced by the aggregate route can be generated by generating the LSP also within the area to which to advertise the aggregate route acquired by aggregating the routes based on the OSPF.

Figure 11:
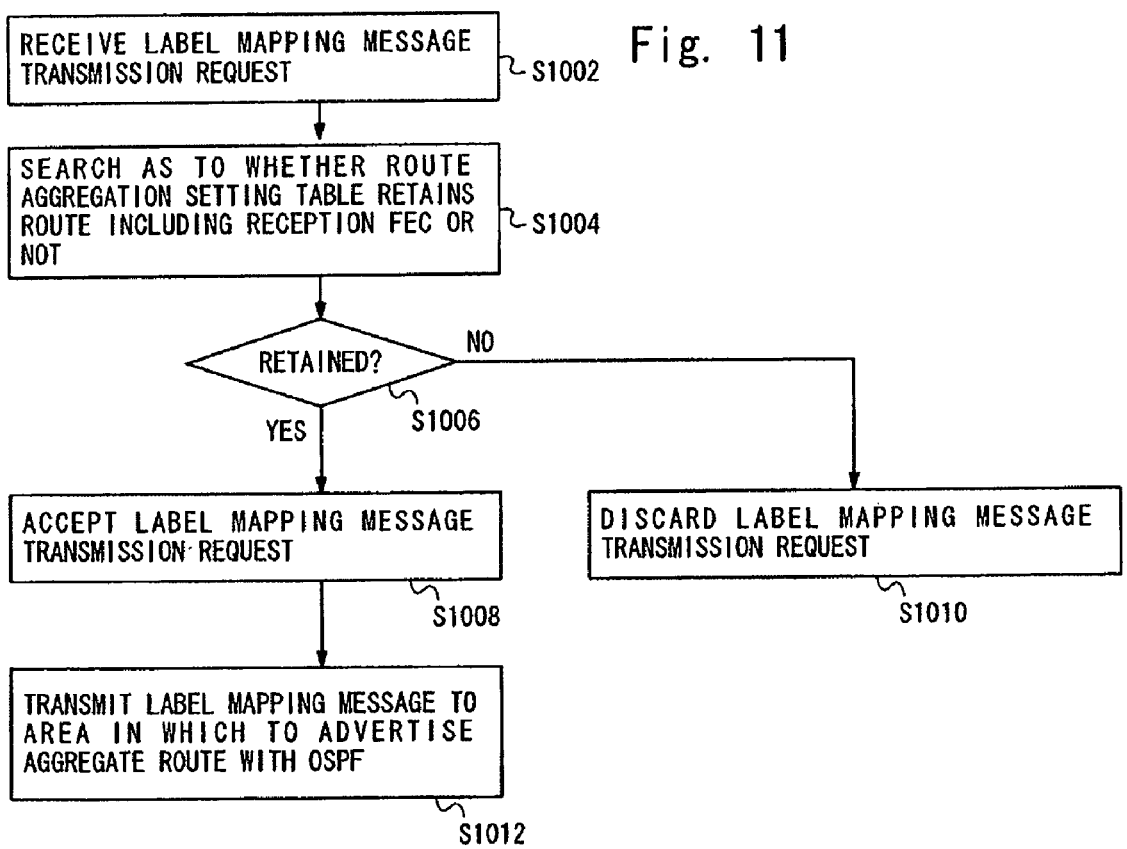
FIG. 11 is a flowchart showing an operation flow when the ABR receives the label mapping message transmission request.

FIG. 11 is a flowchart showing an operation flow when the ABR receives the label mapping message transmission request.

The reception packet control unit 205 of the ABR 100, when receiving the label mapping message transmission request, sends this label mapping message transmission request to the MPLS tunnel generation user request unit 207. The MPLS tunnel generation user request unit 207 transmits the received label mapping message transmission request to the LDP protocol control unit 201 (S1002).

The LDP protocol control unit 201, upon receiving the label mapping message transmission request, checks whether or not the route aggregation setting table 209 retains the FEC of the aggregate route embracing the requested route (S1004). The table 209 retains this FEC, which implies that the ABR 100 advertises the aggregate route embracing the requested route.

If the FEC is retained therein (S1006; YES), the ABR 100 accepts the label mapping message transmission request (S1008).

The LDP protocol control unit 201 instructs the transmission packet control unit 206 to transmit the label mapping message to the area to which the aggregate route embracing the route requested based on the OSPF is advertised. The transmission packet control unit 206 sends the label mapping message of the FEC of the requested route to the neighboring nodes (S1012).

If the FEC is not retained therein (S1006; NO), the ABR 100 discards the label mapping message transmission request.

<Operation of Core Nodes>

An operation when the core node C1 receives the label mapping message of the FEC as the address of a partial route of the aggregate route, will be explained.

When the core node C1 receives the label mapping message of the FEC [1.1.1.2/32], the LDP protocol control unit 201 uses the PEC DB control unit 202 for searches through the FEC DB 210 as to whether the FEC [1.1.1.2/32] exists in this database or not. The core node C1 employs, if the FEC entry is not detected, the aggregate route query unit 203 for confirming that [LS Type-3 Summary-LSA] having the route specified by [1.1.1.0/30] into which the routes are aggregated exists in the FEC DB 210. Then, the core node C1 accepts the label mapping message, and adds the FEC entry of the label mapping message to the FEC DB 210 and the label table 211.

The core node C1 transmits the label mapping message of the FEC of the requested route to the neighboring nodes.

Figure 12:
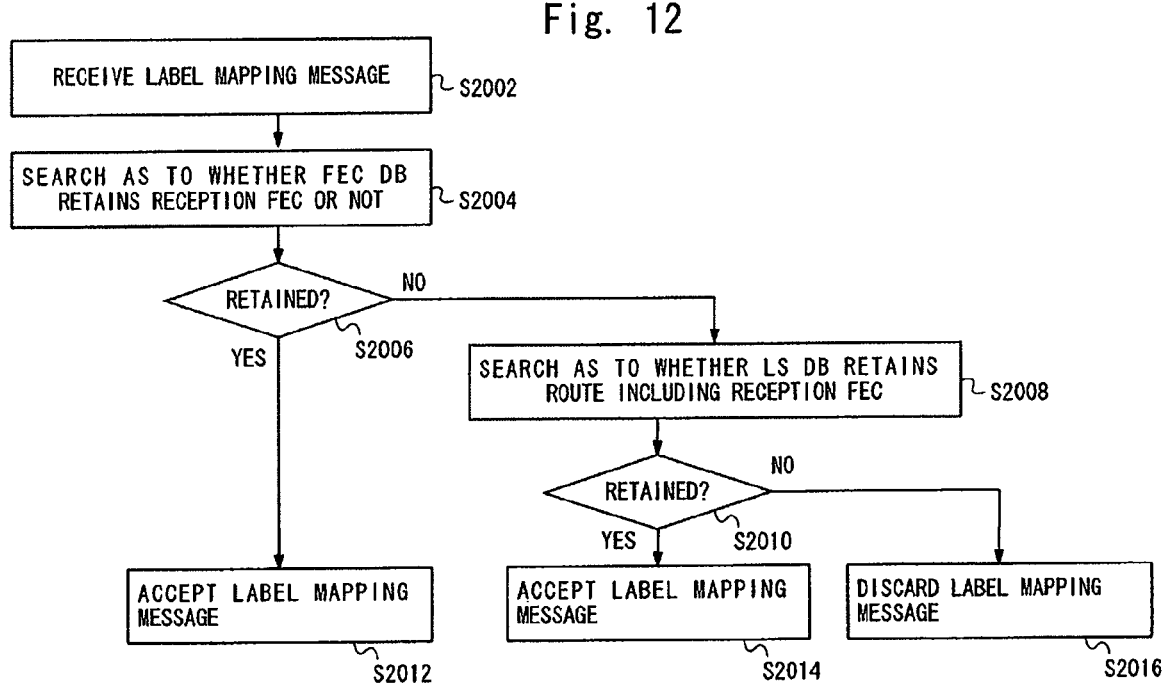
FIG. 12 is a flowchart showing an operation flow when the core node receives the label mapping message.

FIG. 12 is a flowchart showing an operation flow when the core node receives the label mapping message.

The reception packet control unit 205 of the core node, upon receiving the label mapping message, sends this label mapping message to the MPLS tunnel generation user request unit 207. The MPLS tunnel generation user request unit 207 transmits the received label mapping message to the LDP protocol control unit 201 (S2002).

The LDP protocol control unit 201, when receiving the label mapping message, checks through the FEC DB control unit 202 whether the FEC DB 210 retains the FEC of the route requested in the label mapping message or not (S2004).

If the FEC is retained in the FEC DB 210 (S2006; YES), the core node accepts the label mapping message, and adds the FEC entry of the requested route to the FEC DB 210 and the label table 211 (S2012).

If the FEC is not retained in the FEC DB 210 (S2006; NO), the LDP protocol control unit 201 of the core node employs the aggregate route query unit 203 to check whether or not the LSDB 208 retains the [LS Type-3 Summary-LSA] having the FEC of the aggregate route embracing the requested route (S2008).

If the [LS Type-3 Summary-LSA] is retained in the LSDB 208 (S2010; YES), the core node accepts the label mapping message, and adds the FEC entry of the requested route to the FEC DB 210 and the label table 211 (S2014).

If the [LS Type-3 Summary-LSA] is not retained in the LSDB 208 (S2010; NO), the core node discards the label mapping message (S2016).

When accepting the label mapping message (S2012, S2014), the transmission packet control unit 206 transmits the label mapping message of the FEC of the requested route to the neighboring nodes.

Figure 13:
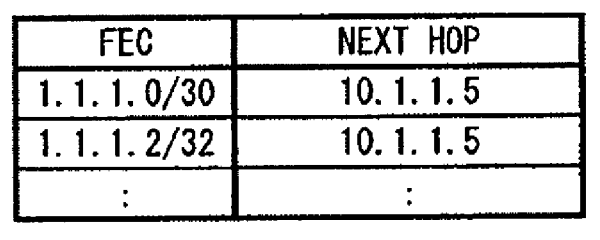

FIG. 13 is a diagram showing the FEC DB of the core node C1 after accepting the label mapping message.

The core node C1, when accepting the label mapping message, adds the [1.1.1.2/32] to the FEC DB 210. On this occasion, the next hop is set to the node having the same address [10.1.1.5] as that of the FEC [1.1.1.0/30] of the aggregate route.

FIG. 14 is a diagram showing a label table of the core node C1 after accepting the label mapping message.

The core node C1, upon accepting the label mapping message, assigns a label [204] as an input label to the FEC [1.1.1.2/32], and adds the entry to the label table 211. The core node C1 sends the label mapping message containing the FEC [1.1.1.2/32] and the label [204] to the neighboring node E4.

The operations of other core nodes and edge nodes are the same as the operation of the core node C1.

FIG. 15 is a diagram showing a label table of the edge node E4 after receiving the label mapping message. The label table 211 of the edge node E4 receiving the label mapping message of the route embraced by the aggregate route, retains the entry of the FEC of the aggregate route and the FEC entries of the routes embraced by the aggregate route.

Each of the core nodes and each of the edge nodes in the area 0 add, as triggered by receiving the label mapping message containing the FEC of the partial route of the aggregate route, the FEC entries of the routes embraced by the aggregate route to the FEC DB 210 and the label table 211. Further, each of the core nodes and each of the edge node in the area 0 can transmit the label mapping message of the FEC to other nodes.

In the area also to which the OSPF-based aggregate route is advertised, the LDP enables the transmission of the label mapping message containing the FEC of the partial route of the aggregate route, and enables the FEC DB 210 and the label table 211 to be updated. As a result, in the area also to which the OSPF-based aggregate route is advertised, it is feasible to generate the MPLS tunnel having the FEC of the partial route of the aggregate route.

Figure 16:
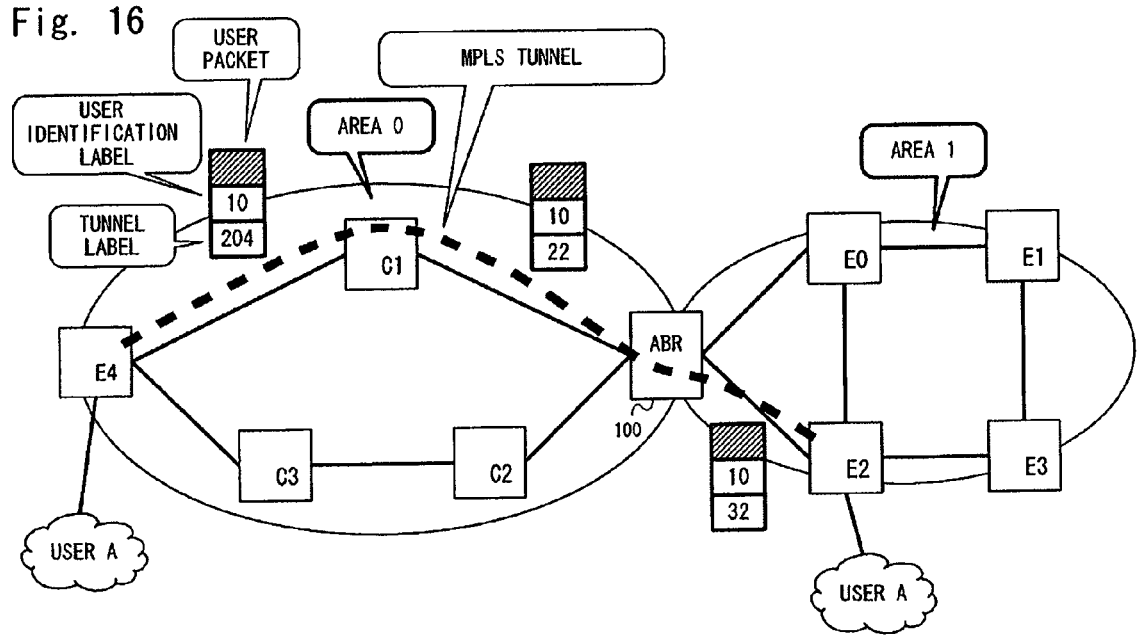
FIG. 16 is a diagram showing an MPLS tunnel between the edge node E4 and an edge node E2.

FIG. 16 is a diagram showing the MPLS tunnel between the edge node E4 and the edge node E2.

It is possible to generate the MPLS tunnel extending from the edge node E4 in the area 0 to the edge node E2 in the area 1 and having a loopback address [1.1.1.2/32] of the edge node E2. This tunnel is the MPLS tunnel that is not terminated by the ABR 100, whereby the LSP can be generated between the two edge nodes and an MPLS VPN service can be provided. The MPLS tunnel is not terminated by the ABR 100, and hence confidentiality of the information in the user packet across the midway nodes and ABR can be kept.

According to the present configuration, when the MPLS LDP node receives the label mapping message, the plurality of routes is aggregated into the aggregate route in the OSPF-based area, and, the nodes in another area to which the advertisement based on the LS Type-3 Summary-LSA is conducted according to the LDP, accept, as the valid FEC, the label mapping message containing the FEC of the aggregate route. Further, the entry is added to the label table, and the MPLS tunnel is generated. Moreover, the label mapping message containing, in addition to the aggregate route, the FECs of the routes embraced by the aggregate route is accepted, then the entries are added to the FEC DB and to the label table, and the MPLS tunnel is thus generated. This scheme enables the generation of the MPLS tunnel containing the FECs of the routes embraced by the aggregate route in the area to which the OSPF-based aggregate route is advertised.

(Delete of MPLS Tunnel (1))

A description of how the MPLS tunnel is deleted will be given.

Figure 17:
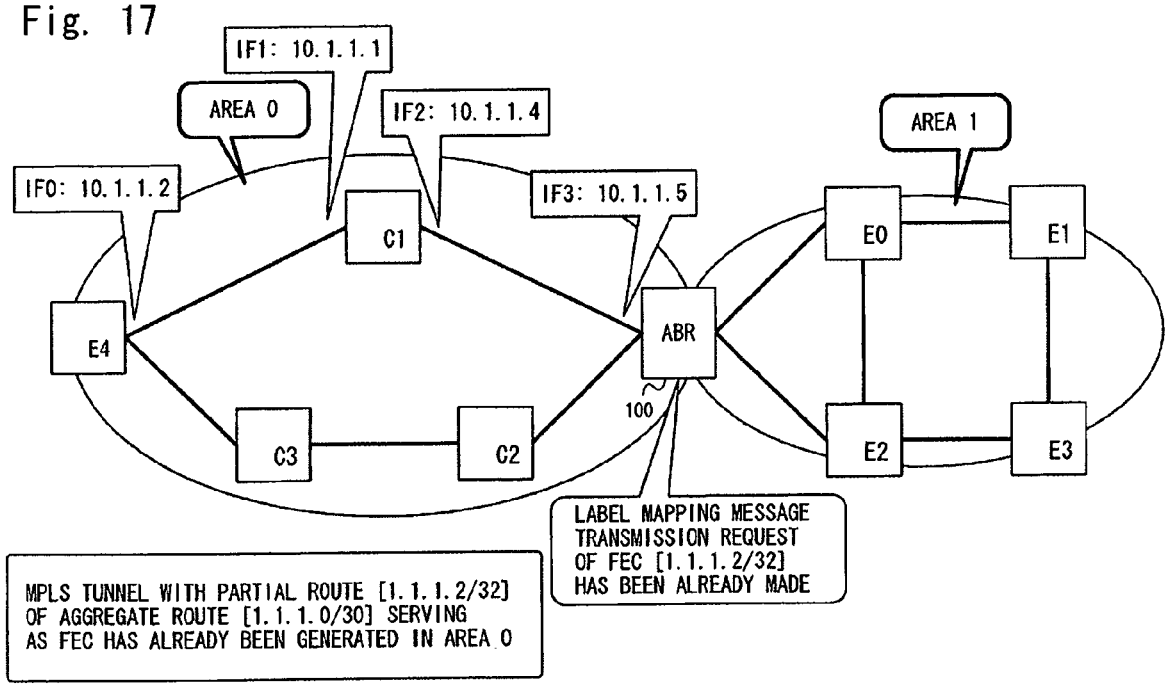
FIG. 17 is a view showing an example of a network architecture.

FIG. 17 is a diagram showing an example of a network architecture after generating the MPLS tunnel. In this network, the MPLS tunnel having the FEC that is the partial route [[1.1.1.2/32] of the aggregate route [1.1.1.0/30] is generated in the area 0.

Figure 18:
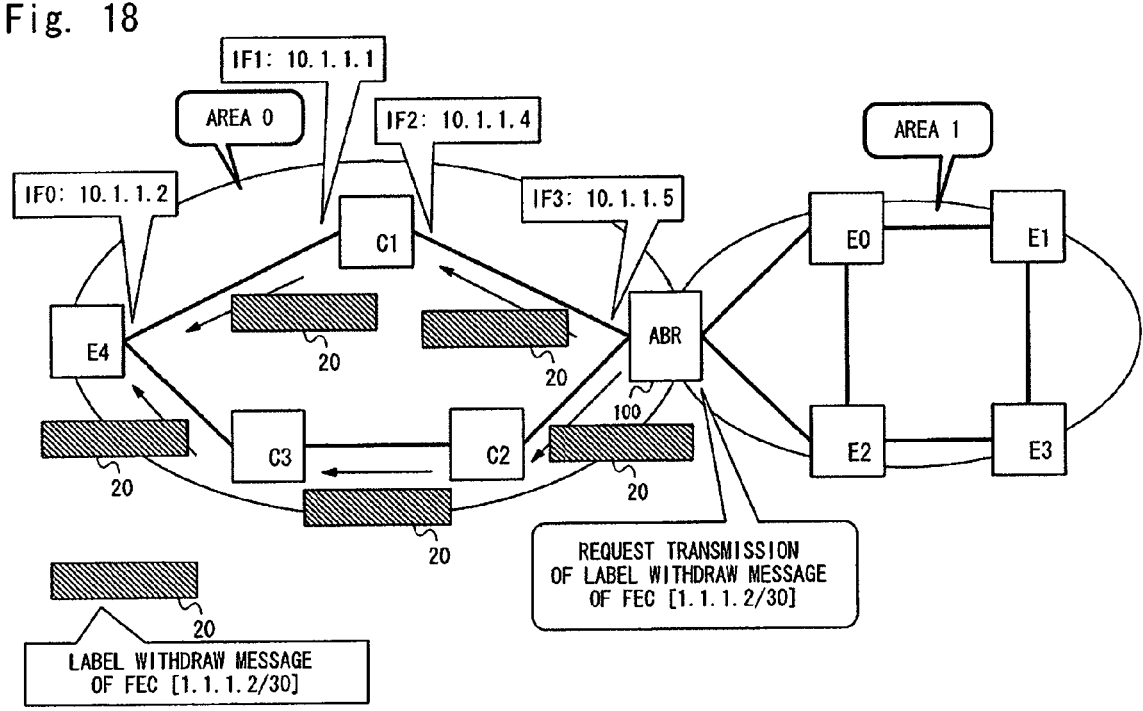
FIG. 18 is a diagram showing how a label withdraw message of an FEC [1.1.1.2/30] is transmitted.

FIG. 18 is a diagram showing a network architecture when transmitting the label withdraw message in the network illustrated in FIG. 17.

When the core node C1 receives the label withdraw message containing the FEC that is the aggregate route [1.1.1.0/30], the LDP protocol control unit 201 uses the FEC DB Control unit 202 to search through the FEC DB 210 (FIG. 13). This search involves searching for not only the FEC of the aggregate route but also the FEC of the route embraced by the aggregate route. As a result, [1.1.1.0/30] and [1.1.1.2/32] are extracted. Then, the core node C1 accepts the label withdraw message.

Figure 19:
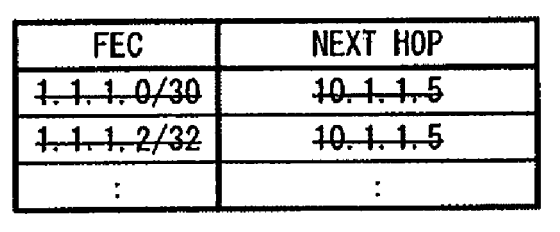

FIG. 19 is a diagram showing the FEC DB of the core node C1 after accepting the label withdraw message.

The FEC DB control unit 202 of the core node C1, when accepting the label withdraw message, deletes the entries of [1.1.1.0/30] and [1.1.1.2/32] from the FEC DB 210.

FIG. 20 is a diagram illustrating the label table of the core node C1 after accepting the label withdraw message.

The LDP protocol control unit 201 of the core node C1, upon accepting the label withdraw message, deletes the entries of [1.1.1.0/30] and [1.1.1.2/32] from the label table 211.

The core node C1 transmits the label withdraw message of the FEC [1.1.1.0/30] to the neighboring edge node E4.

The operations of other core nodes and edge nodes are the same as the core node C1 operates.

FIG. 21 is a diagram showing the label table of the edge node E4 after accepting the label withdraw message. The edge node E4, when accepting the label withdraw message, deletes the entries of the FEC [1.1.1.0/30] and the FEC [1.1.1.2/32] from the label table 211.

Figure 22:
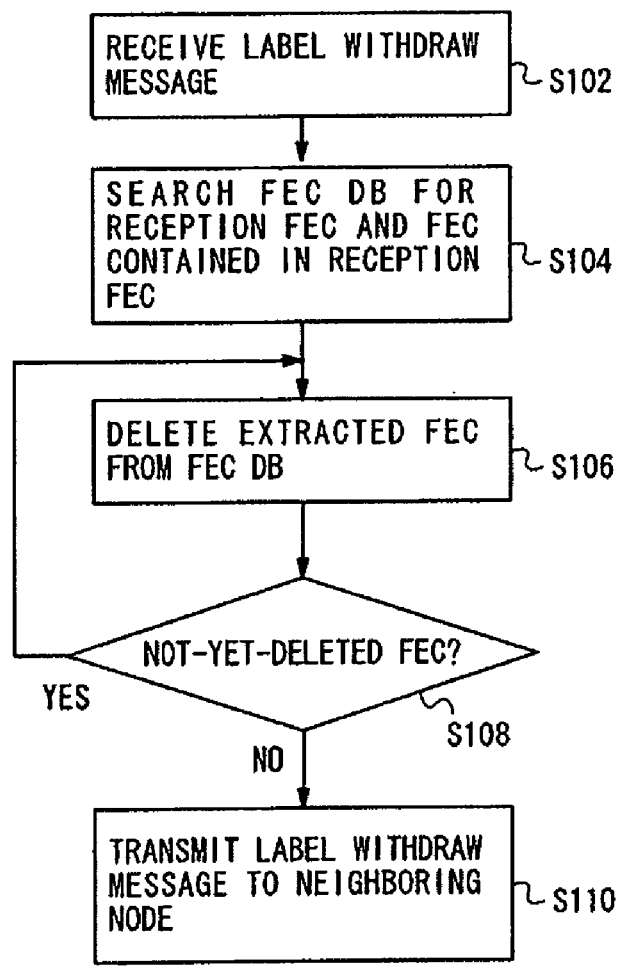
FIG. 22 is a flowchart showing an operation flow when the core node receives the label withdraw message of the aggregate route.

FIG. 22 is a flowchart showing an operation flow when the core node receives the label withdraw message of the aggregate route.

When the node receives the label withdraw message of the aggregate route (S102), the LDP protocol control unit 201 employs the FEC DB control unit 202 for searching FEC DB 210 for the entry of the FEC of the aggregate route and for the entries of the routes embraced by the aggregate route (S104).

The FEC DB control unit 202 deletes the extracted FEC entries from the FEC DB 210 (S106). If there is the undeleted FEC entry in the extracted FEC entries (S108; YES), the undeleted FEC entry is deleted.

If all of the extracted FEC entries are deleted (S108; NO), the LDP protocol control unit 201 instructs the transmission packet control unit 206 to transmit the label withdraw message to the neighboring node (S110).

The node in the area 0, when receiving the label withdraw message containing the FEC of the aggregate route, deletes the entry of the FEC of the aggregate route from the FEC DB 210 and the label table 211. Further, the entries of the FECs of the routes embraced by the aggregate route are also deleted from the FEC DB 210 and the label table 211. Still further, the node can transmit the label withdraw message containing the FEC of the aggregate route to other nodes.

The MPLS LDP node, when receiving the label withdraw message, deletes the received FEC entry from the FEC DB and the label table. Moreover, the entries of the FECs of the routes embraced by the route having the received FEC are deleted from the PEC DB and the label table. Hence, within the area to which the OSPF-based aggregate route is advertised, when receiving the label withdraw message, it is feasible to delete not only the MPLS tunnel having the FEC of the aggregate route but also the MPLS tunnel of the FECs of the routes embraced by the aggregate route.

(Delete of MPLS Tunnel (2))

FIG. 17 is a diagram showing an example of a network architecture after generating the MPLS tunnel. In this network, the MPLS tunnel having the FEC that is the partial route [1.1.1.2/32] of the aggregate route [1.1.1.0/30] is generated in the area 0.

Figure 23:
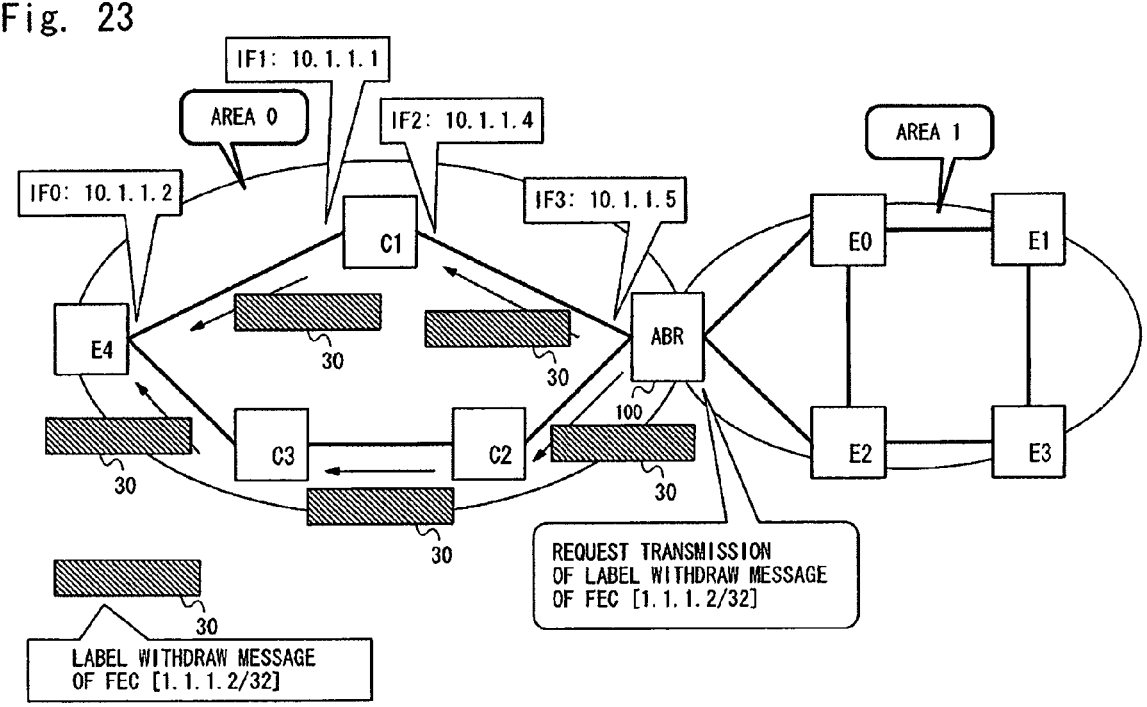
FIG. 23 is a diagram showing how the label withdraw message of an FEC [1.1.1.2/32] is transmitted.

FIG. 23 is a diagram showing a network architecture when transmitting the label withdraw message transmission request for the routes embraced by the aggregate route in the network illustrated in FIG. 17.

When the ABR 100 is requested to transmit the label withdraw message containing the FEC [1.1.1.2/32] of the route embraced by the aggregate route, the LDP protocol control unit 201 uses the FEC DB control unit 202 to check whether the FEC DB 210 retains the entry of the FEC [1.1.1.2/32] or not. Further, the LDP protocol control unit 201 recognizes from the setting information that the label mapping message containing the FEC [1.1.1.2/32] has already been advertised to the core nodes C1, C2 in the area 0 to which the aggregate route is advertised. The LDP protocol control unit 201 accepts the label withdraw message transmission request, and transmits the label withdraw message containing the FEC [1.1.1.2/32] to the neighboring core nodes C1, C2 in the area 0 to which the aggregate route is advertised.

When another node receives the label withdraw message containing the FEC [1.1.1.2/32], the entry of the FEC is deleted from the FEC DB 210 and the label table 211, and the label withdraw message is sent to the neighboring node.

Figure 24:
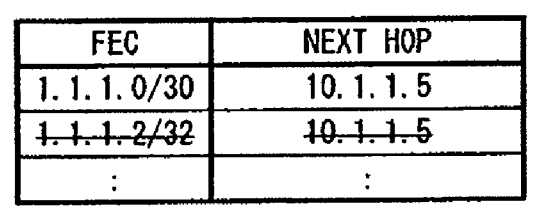

FIG. 24 is a diagram showing the FEC DB of the core node C1 after accepting the label withdraw message.

The FEC DB control unit 202 of the core node C1, when accepting the label withdraw message containing the FEC [1.1.1.2/32], deletes the entry of [1.1.1.2/32] from the FEC DB 210.

FIG. 25 is a diagram showing the label table of the core node C1 after accepting the label withdraw message.

The LDP protocol control unit 201 of the core node C1, upon accepting the label withdraw message containing the FEC [1.1.1.2/32], deletes the entry of [1.1.1.2/32] from the label table 211.

The core node C1 transmits the label withdraw message containing the FEC [1.1.1.2/32] to the neighboring edge node E4.

The operations of other core nodes and edge nodes are the same as the core node C1 operates.

FIG. 26 is a diagram showing the label table of the edge node E4 after accepting the label withdraw message containing the FEC [1.1.1.2/32]. The edge node E4, when accepting the label withdraw message, deletes the entry of the FEC [1.1.1.2/32] from the label table 211.

Figure 27:
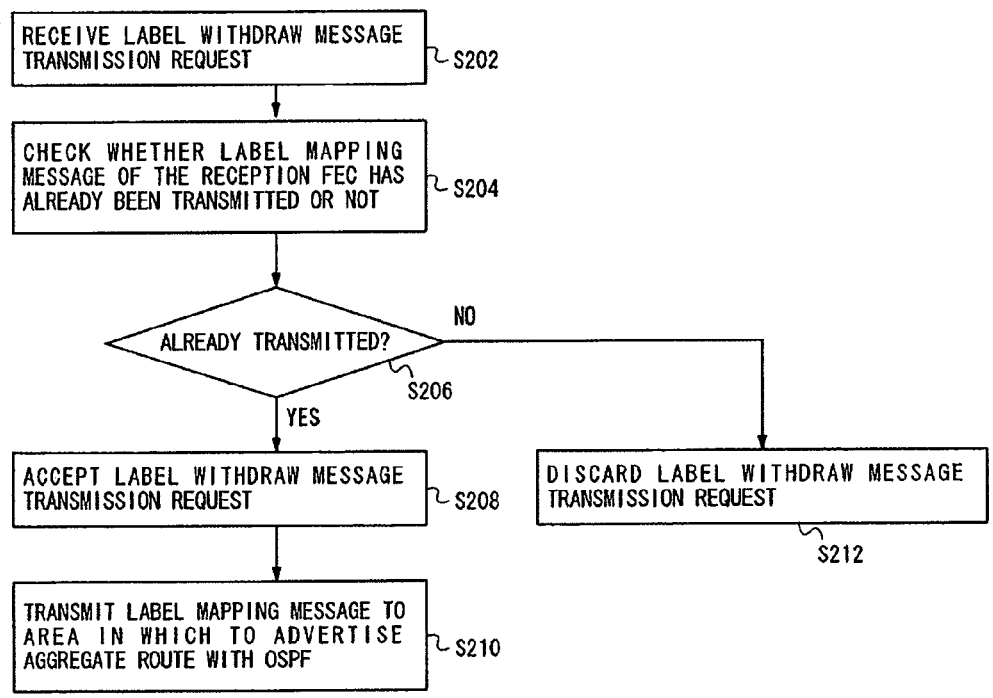
FIG. 27 is a flowchart showing an operation flow when the ABR receives a label withdraw message transmission request.

FIG. 27 is a flowchart showing an operation flow when the ABR receives the label withdraw message transmission request for the routes embraced by the aggregate route.

When the ABR 100 receives the label withdraw message transmission request for the routes embraced by the aggregate route (S202), the LDP protocol control unit 201 receives this message via the MPLS tunnel generation user request unit 207. The LDP protocol control unit 201 employs the FEC DB control unit 202 to search the FEC DB 210 for the entries of the routes embraced by the aggregate route. Moreover, the LDP protocol control unit 201 checks whether or not the label mapping message of the route is transmitted to the area to which the OSPF-based aggregate route is advertised (S204).

If transmitted (S206; YES), the LDP protocol control unit 201 accepts the label withdraw message transmission request.

The LDP protocol control unit 201 instructs the transmission packet control unit 206 to transmit the label withdraw message to the area to which the OSPF-based aggregate route is advertised. The transmission packet control unit 206 transmits the label withdraw message containing the FEC of the requested route to the neighboring node (S210).

If not transmitted (S206; NO), the ABR 100 discards the label withdraw message transmission request (S212).

With a trigger that the label withdraw message transmission request is given to the ABR, the label withdraw message containing the FECs of the routes embraced by the aggregate route can be sent to the nodes in the area to which the ABR advertises the aggregate route.

The MPLS LDP node requests the ABR to transmit the label withdraw message containing the FECs of the routes embraced by the aggregate route in response to a request of the user, and it is possible to delete the MPLS tunnel having the FECs of the routes embraced by the aggregate route by transmitting the label withdraw message containing the FECs within the area to which the OSPF-based aggregate route is advertised.

(Delete of MPLS Tunnel (3))

FIG. 17 is a diagram showing an example of a network architecture after generating the MPLS tunnel. In this network, the MPLS tunnel having the FEC that is the partial route [1.1.1.2/32] of the aggregate route [1.1.1.0/30] is generated in the area 0.

Figure 28:
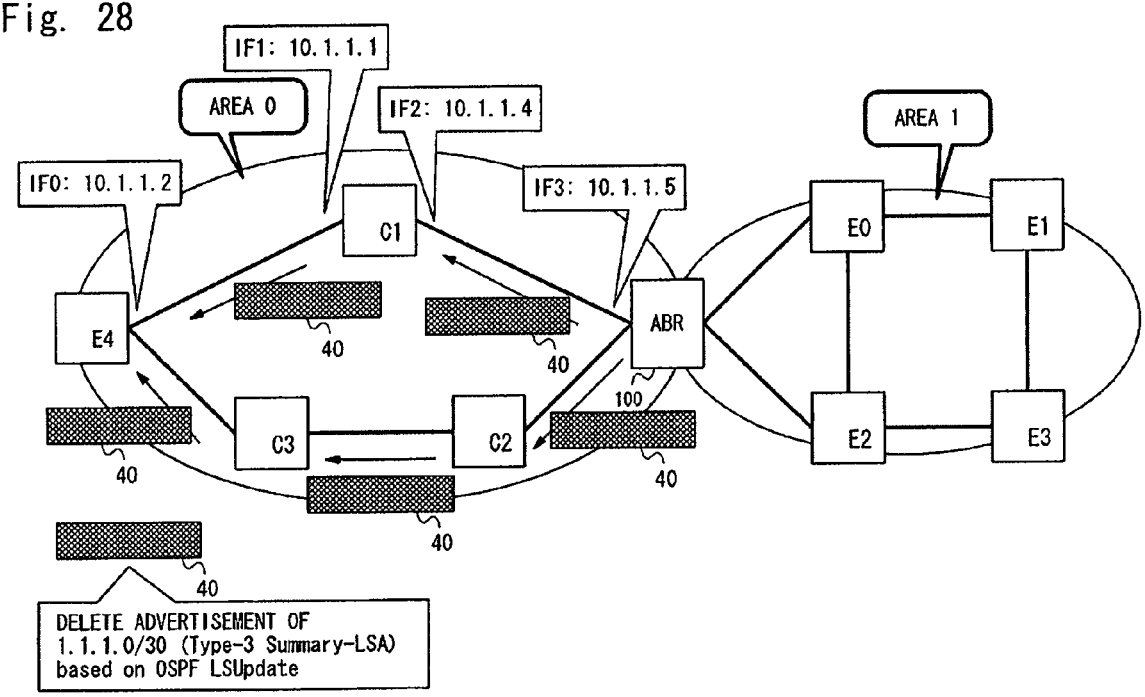
FIG. 28 is a diagram showing a delete advertisement of 1.1.1.0/30 (LS Type-3. Summary-LSA) based on OSPF LSUpdate.

FIG. 28 is a diagram showing an operation when receiving OSPF LSUpdate for deleting the aggregate route.

The core node C1 receives a message of LSAge=0 representing deletion of the LSA, in which the LSA of the OSPF LSUpdate is [LS Type-3 Summary-LSA route 1.1.1.0/30].

The OSPF protocol control unit 204, after deleting the LSA from the LS DB 208, notifies the LDP protocol control unit 201 that the route of [1.1.1.0/30] is deleted. The LDP protocol control unit 201 uses the FEC DB control unit 202 to search for the FEC and the FECs of the routes embraced by the route of this FEC. The FEC DB control unit 202 retains [1.1.1.0/30] and [1.1.1.2/32], and these FECs are extracted.

Figure 29:
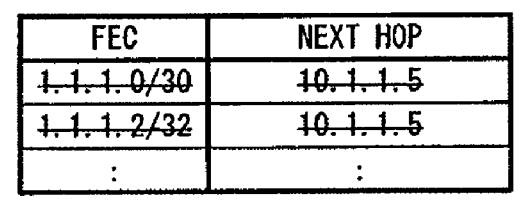

FIG. 29 is a diagram showing the FEC DE of the core node C1. The FEC DB control unit 202 of the core node C1 deletes the entries of [1.1.1.0/30] and [1.1.1.2/32] from the FEC DE 210.

FIG. 30 is a diagram showing the label table of the core node C1. The LDP protocol control unit 201 of the core node C1 deletes the [1.1.1.0/30] and [1.1.1.2/32] from the label table 211.

The operations of other core nodes and edge nodes are the same as the core node C1 operates.

FIG. 31 is a diagram showing the label table of the edge node E4. The edge node E4 deletes the entries of the FEC [1.1.1.0/30] and the FEC [1.1.1.2/32] from the label table 211.

Figure 32:
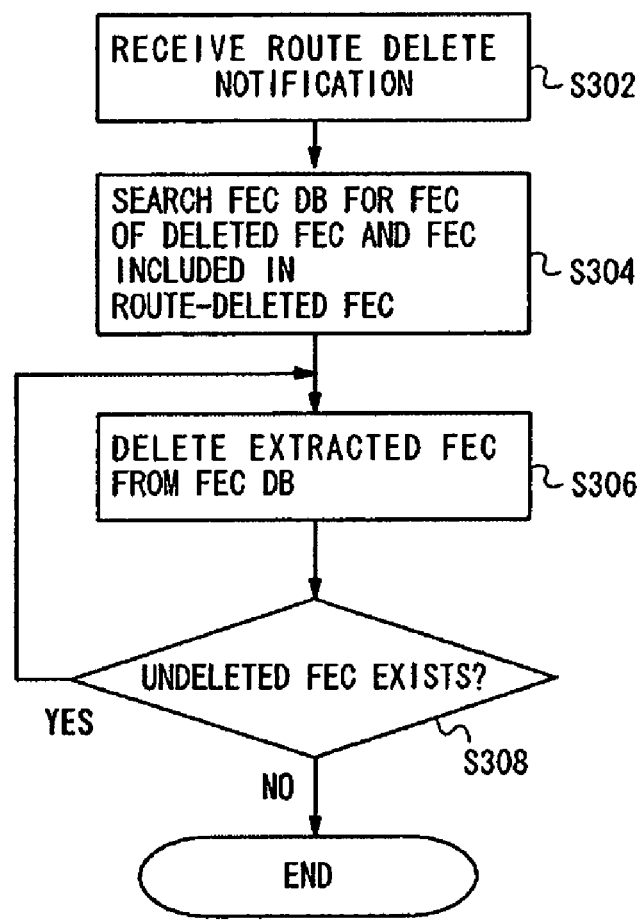
FIG. 32 is a flowchart showing an operation flow when the core node receives OSPF-based route delete notification.
Figure 33:
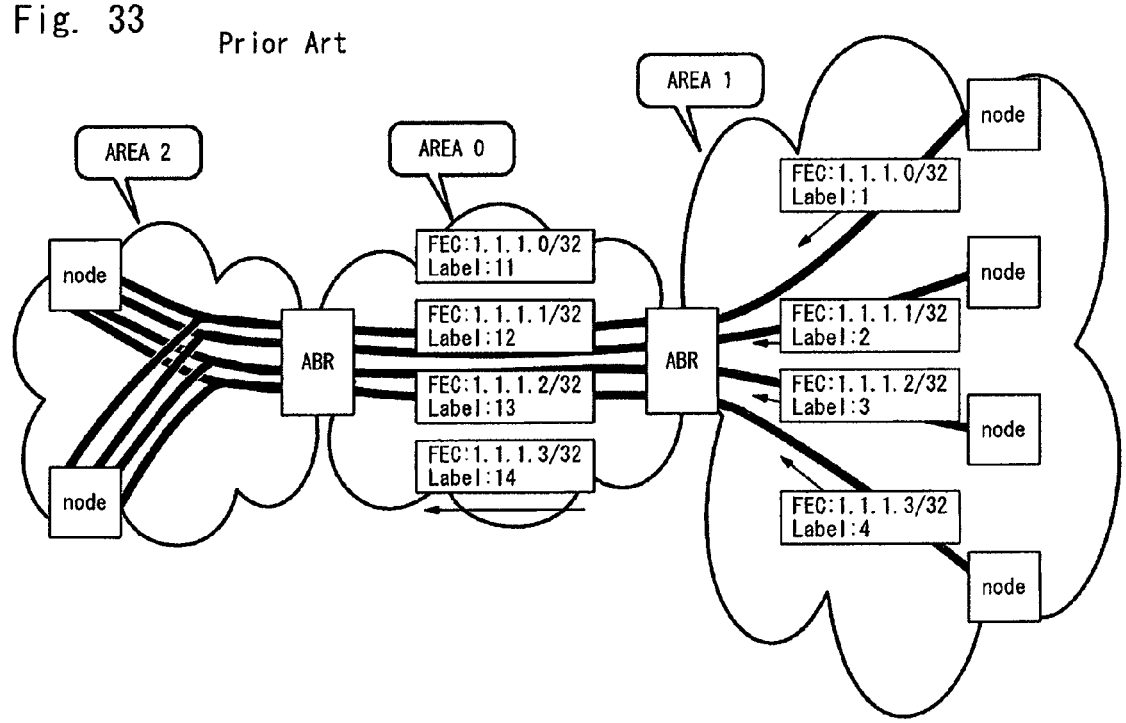
FIG. 33 is a diagram showing an LDP operation in the case of using none of the route aggregation according to multi-area OSPF.
Figure 34:
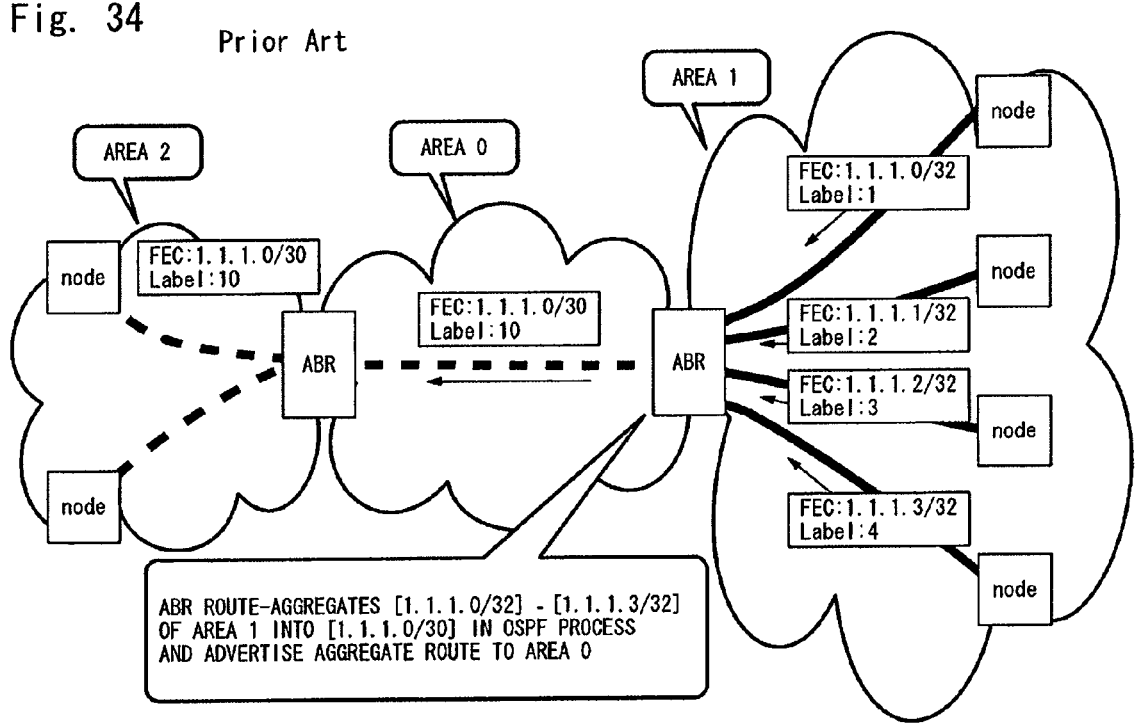
FIG. 34 is a diagram showing an LDP operation in the case of using the route aggregation according to the multi-area OSPF.
Figure 35:
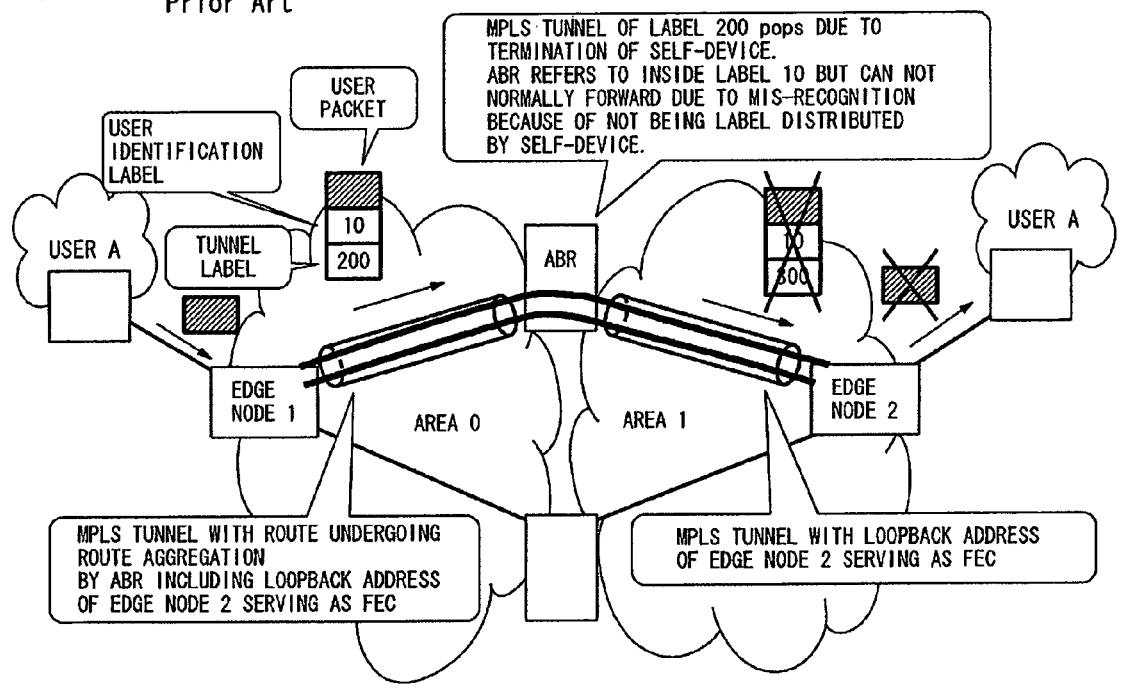
FIG. 35 is a diagram showing an example of providing an MPLS VPN using the LDP by conducting the OSPF-based route aggregation.

FIG. 32 is a diagram showing an operation flow when the core node receives OSPF route delete notification.

When the core node receives LS Type-3 Summary-LSA delete message of the OSPF-based aggregate route (S302), the OSPF protocol control unit 204 deletes the route information contained in this message from the LS DB 208.

The LDP protocol control unit 201 uses the FEC DB control unit 202 to search the FEC DB 210 for the deleted entry of the FEC of the aggregate route and the entries of the FECs of the routes embraced by the aggregate route (S304).

The FEC DB control unit 202 deletes the entries of the extracted FECs from the FEC DB 210 (S306). If an entry of undeleted FEC exists in the entries of the extracted FECs (S308; YES), the FEC DB control unit 202 deletes the entry of the undeleted FEC.

If all of the entries of the extracted FECs are deleted (S108; NO), the processing comes to an end.

The node in the area 0, when receiving the LS Type-3 Summary-LSA delete message of the OSPF-based aggregate route, deletes the entry of the FEC of the aggregate route from the FEC DB 210 and the label table 211. Further, the entries of the FECs of the routes embraced by the aggregate route are also deleted from the FEC DB 210 and the label table 211.

The MPLS LDP node, when LS Type-3 Summary-LSA delete message of the OSPP-based aggregate route, deletes the entry of the deleted FEC of the aggregate route from the FEC DB and from the label table. Further, the entries of the FECs of the routes embraced by the aggregate route are likewise deleted from the FEC DB and from the label table. It is therefore feasible to delete not only the MPLS tunnel of the FEC of the aggregate route but also the MPLS tunnel of the FECs of the routes embraced by the aggregate route in the area to which the OSPF-based aggregate route is advertised.

(Algorithm for Determining that Aggregate Route Embraces Target Route)

An algorithm for determining that a target route is embraced by the aggregate route, will be described.

A prefix and a mask of an aggregate route X are designated by prefix-X and mask-X, respectively. A prefix and a mask of a target route Y are designated by prefix-Y and mask-Y, respectively.

At this time, if the following formula is true, the target route Y is embraced by the aggregate route X. Further, whereas if the following formula is false, the target route Y is not embraced by the aggregate route X.

$$(\text{prefix-}X \,\&\, \text{mask-}X) == (\text{prefix-}Y \,\&\, \text{mask-}X) \quad \text{[Formula 1]}$$

where [&] represents an AND operator of a bit, and [==] designates an equal operator.

For example, the prefix-X and the mask-X of the aggregate route X are given such as prefix-X=1.1.1.0 and mask-X=255.255.255.0, and prefix-Y and mask-Y of the target route Y are given such as prefix-Y=1.1.1.2 and mask-Y=255.255.255.255. This connotes that the aggregate route X is [1.1.1.0/30] and the target route is [1.1.1.2/32].

These values are expressed by binary numbers as follows.

$$\begin{aligned}
\text{prefix-}X: &\;\; 00000001\;\; 00000001\;\; 00000001\;\; 00000000 \\
\text{mask-}X: &\;\; 11111111\;\; 11111111\;\; 11111111\;\; 11111100 \\
\text{prefix-}Y: &\;\; 00000001\;\; 00000001\;\; 00000001\;\; 00000010 \\
\text{mask-}Y: &\;\; 11111111\;\; 11111111\;\; 11111111\;\; 11111111
\end{aligned} \quad \text{[Formula 2]}$$

Hence, $$\begin{aligned}
\text{prefix-}X \,\&\, \text{mask-}X &= \\
& 00000001\;\; 00000001\;\; 00000001\;\; 00000000 \\
\text{prefix-}Y \,\&\, \text{mask-}X &= \\
& 00000001\;\; 00000001\;\; 00000001\;\; 00000000
\end{aligned} \quad \text{[Formula 3]}$$

Hence, (prefix-$X$ & mask-$X$) = (prefix-$Y$ & mask-$X$)

Accordingly, the target route Y in this example is the route embraced by the aggregate route X.

(Operation and Effect of Embodiment)

According to the present embodiment, the MPLS VPN network service involves using the LDP as the label distribution protocol, wherein the labels of the FECs of the routes embraced by the aggregate route can be distributed in the area where the routes are aggregated based on the OSPF.

According to the present embodiment, in the case of route-aggregating, based on the OSPF, the loopback addresses of the edge nodes in a certain area, it is feasible to generate the MPLS tunnel extending across the OSPF-based area including the egress node that is the edge node in another area and the ingress node that is the edge node with the loopback addresses aggregated by the ABR in the same way as in a non-route-aggregated case. Moreover, it is possible to provide the MPLS VPN service in which these edge nodes are the end points.

What is claimed is:

1. A communication device, in a Multi Protocol Label Switch (MPLS) network including at least a first area and a second area each as a unit for setting aggregation of pieces of route information, said first area being notified of aggregate route information into which the pieces of route information of a plurality of routes within said second area are aggregated, and using a Label Distribution Protocol (LDP) for generating a Label Switched Path (LSP) by distributing labels corresponding to the pieces of route information, being located within said first area and receiving a label mapping message for generating the LSP spanning between said first area and said second area and using one of the plurality of routes within said second area, said communication device comprising:

an aggregate route information storage unit stored with the aggregate route information into which the pieces of route information are aggregated;

a route information storage unit stored with the aggregate route information and pieces of route information;

a label storage unit stored with the labels corresponding to the aggregate route information and the pieces of route information stored in said route information storage unit;

a determining unit determining, when receiving the label mapping message, whether a route information contained in the label mapping message is stored in said route information storage unit or not; and a label control unit accepting, if the route information is not stored in said route information storage unit and a route specified by the route information is a route specified by one of the pieces of route information aggregated into the aggregate route information stored in said aggregate route information storage unit, the label mapping message and executing a label distribution process, wherein the label distribution process includes storing the route information in said route information storage unit, allocating a label to the route information, storing the label in said label storage unit, and forwarding the label mapping message containing the route information to a neighboring communication device, said determining unit, when receiving a label withdraw message for deleting the LSP of the aggregate route information into which the pieces of route information are aggregated, determines whether or not the aggregate route information and the pieces of route information aggregated into the aggregate route information, which are contained in the label withdraw message, are stored in said route information storage unit, said label control unit, if the aggregate route information and the pieces of route information aggregated into the aggregate route information are stored in said route information storage unit, accepts the label withdraw message and executes a label delete process, and the label delete process includes deleting the aggregate route information and the pieces of route information aggregated into the aggregate route information from said route information storage unit, deleting the labels corresponding to the aggregate route information and the pieces of route information aggregated into the aggregate route information from said label storage unit, and forwarding the label withdraw message containing the aggregate route information to a neighboring communication device.

2. A communication device, in a Multi Protocol Label Switch (MPLS) network including at least a first area and a second area each as a unit for setting aggregation of pieces of route information, said first area being notified of aggregate route information into which the pieces of route information of a plurality of routes within said second area are aggregated, and using a Label Distribution Protocol (LDP) for generating a Label Switched Path (LSP) by distributing labels corresponding to the pieces of route information, being located within said first area and receiving a label mapping message for generating the LSP spanning between said first area and said second area and using one of the plurality of routes within said second area, said communication device comprising:

an aggregate route information storage unit stored with the aggregate route information into which the pieces of route information are aggregated;

a route information storage unit stored with the aggregate route information and pieces of route information;

a label storage unit stored with the labels corresponding to the aggregate route information and the pieces of route information stored in said route information storage unit;

a determining unit determining, when receiving the label mapping message, whether a route information contained in the label mapping message is stored in said route information storage unit or not;

a label control unit accepting, if the route information is not stored in said route information storage unit and a route specified by the route information is a route specified by one of the pieces of route information aggregated into the aggregate route information stored in said aggregate route information storage unit, the label mapping message and executing a label distribution process; and an aggregate route information control unit deleting, when receiving a delete request message of the aggregate route information stored in said aggregate route information storage unit, the aggregate route information from said aggregate route information storage unit, wherein the label distribution process includes storing the route information in said route information storage unit, allocating a label to the route information, storing the label in said label storage unit, and forwarding the label mapping message containing the route information to a neighboring communication device, said determining unit determines whether or not said route information storage unit is stored with the aggregate route information and the pieces of route information aggregated into the aggregate route information in the delete request message, and said label control unit, if said route information storage unit is stored with the aggregate route information and the pieces of route information aggregated into the aggregate route information, deletes the aggregate route information and the pieces of route information aggregated into the aggregate route information from said route information storage unit, and also deletes the labels corresponding to the aggregated route information and the pieces of route information aggregated into the aggregate route information from said label storage unit.

3. A communication device, in a Multi Protocol Label Switch (MPLS) network including at least a first area and a second area each as a unit for setting aggregation of pieces of route information, said first area being notified of aggregate route information into which the pieces of route information of a plurality of routes within said second area are aggregated, and using a Label Distribution Protocol (LDP) for generating a Label Switched Path (LSP) by distributing labels corresponding to the pieces of route information, being located at a border between said first area and said second area and receiving a label mapping message transmission request for generating the LSP spanning between said first area and said second area and using one of the plurality of routes within said second area, said communication device comprising:

a route aggregation setting storage unit stored with the aggregate route information, advertised by said communication device to said first area, into which the pieces of route information are aggregated;

a route information storage unit stored with route information embraced by the aggregate route information and pieces of route information; and a label control unit accepting, if receiving the label mapping message transmission request and a route specified by a route information in the label mapping message transmission request is a route specified by one of the pieces of route information aggregated into the aggregate route information stored in said route aggregation setting storage unit, the label mapping message transmission request and forwarding the label mapping message transmission request containing the route information to a neighboring communication device, wherein the neighboring communication device comprises:

a determining unit determining, when receiving a label withdraw message for deleting the LSP of the aggregate route information into which the pieces of route information are aggregated, whether or not the aggregate route information and the pieces of route information aggregated into the aggregate route information, which are contained in the label withdraw message, are stored in a route information storage unit of the neighboring communication device, a label control unit accepting, if the aggregate route information and the pieces of route information aggregated into the aggregate route information are stored in said route information storage unit of the neighboring communication device, the label withdraw message and executes a label delete process, and the label delete process including deleting the aggregate route information and the pieces of route information aggregated into the aggregate route information from said route information storage unit of the neighboring communication device, deleting labels corresponding to the aggregate route information and the pieces of route information aggregated into the aggregate route information from a label storage unit of the neighboring communication device, and forwarding the label withdraw message containing the aggregate route information to a neighboring communication device.

4. The communication device according to claim 3, wherein said label control unit if a label withdraw message transmission request for deleting the LSP spanning between said first area and said second area and using one of the plurality of routes within said second area is received and a route specified by a route information contained in the label withdraw message transmission request is a route specified by one of the pieces of route transmission aggregated into the aggregate route information stored in said route aggregation setting storage unit, accepts the label withdraw message transmission request and also forwards a label withdraw message transmission request containing the route information to a neighboring communication device.

* * * * *